United States Patent
Guo et al.

(10) Patent No.: US 9,946,003 B2
(45) Date of Patent: Apr. 17, 2018

(54) LIGHT GUIDING STRUCTURE FOR GUIDING LIGHT TRANSMITTED FROM A PLURALITY OF LIGHT EMITTING COMPONENTS AND LIGHT EMITTING DEVICE THEREWITH

(71) Applicant: Wistron Corporation, New Taipei (TW)

(72) Inventors: Zhi Ming Guo, New Taipei (TW); Chen-Yu Li, New Taipei (TW); Jun Hao Wang, New Taipei (TW); Chong-Xing Zhu, New Taipei (TW)

(73) Assignee: Wistron Corporation, New Taipei (TW)

( * ) Notice: Subject to any disclaimer, the term of this patent is extended or adjusted under 35 U.S.C. 154(b) by 85 days.

(21) Appl. No.: 15/163,654

(22) Filed: May 24, 2016

(65) Prior Publication Data

US 2017/0242180 A1    Aug. 24, 2017

(30) Foreign Application Priority Data

Feb. 18, 2016    (CN) .......................... 2016 1 0091947

(51) Int. Cl.
*B60Q 1/26*    (2006.01)
*F21V 8/00*    (2006.01)
(Continued)

(52) U.S. Cl.
CPC ............ *G02B 6/0008* (2013.01); *F21V 5/007* (2013.01); *F21V 17/101* (2013.01); *F21K 9/61* (2016.08);
(Continued)

(58) Field of Classification Search
None
See application file for complete search history.

(56) References Cited

U.S. PATENT DOCUMENTS

| | | | |
|---|---|---|---|
| 8,348,489 B2 * | 1/2013 | Holman | G02B 6/0028 313/508 |
| 8,974,103 B2 * | 3/2015 | Chen | G02B 6/0096 362/458 |

(Continued)

FOREIGN PATENT DOCUMENTS

| | | |
|---|---|---|
| CN | 203431568 U | 2/2014 |
| TW | M298681 | 10/2006 |
| TW | 201439615 A | 10/2014 |

OTHER PUBLICATIONS

Office action dated Jun. 16, 2017 for Taiwan application No. 105106250, filing date Mar. 2, 2016, p. 2 line 17-26, p. 3-6 and p. 7 line 1-2.

*Primary Examiner* — Vip Patel
(74) *Attorney, Agent, or Firm* — Winston Hsu

(57) ABSTRACT

A light guiding structure includes a resilient base and a plurality of light guiding columns. A plurality of through holes is separately formed on the resilient base. The plurality of light guiding columns resiliently engages with the plurality of through holes. Each of a plurality of light emitting components is disposed on an end of each of the plurality of the light guiding columns. The light guiding structure utilizes the plurality of light guiding columns for guiding the light transmitted from the plurality of light emitting components and further utilizes the resilient base for allowing the light transmitted from one of the plurality of light emitting components to pass through the corresponding light guiding column only. Therefore, the light transmitted from the plurality of light emitting components can be guided to a correct position, which effectively reduces human misjudgment.

16 Claims, 6 Drawing Sheets

(51) Int. Cl.
*F21V 17/10* (2006.01)
*F21V 5/00* (2018.01)
*F21V 17/06* (2006.01)
*F21W 111/00* (2006.01)
*F21K 9/61* (2016.01)
*F21Y 113/10* (2016.01)

(52) U.S. Cl.
CPC .......... *F21V 17/06* (2013.01); *F21W 2111/00* (2013.01); *F21Y 2113/10* (2016.08)

(56) References Cited

U.S. PATENT DOCUMENTS

2009/0244922 A1* 10/2009 Hayakawa ........... G02B 6/0006
362/555
2014/0307462 A1 10/2014 Wang He \* cited by examiner

LIGHT GUIDING STRUCTURE FOR GUIDING LIGHT TRANSMITTED FROM A PLURALITY OF LIGHT EMITTING COMPONENTS AND LIGHT EMITTING DEVICE THEREWITH

BACKGROUND OF THE INVENTION

1. Field of the Invention

The present disclosure relates to a light guiding structure and a light emitting device, and more particularly, to a light guiding structure for guiding light transmitted from a plurality of light emitting components, and a light emitting device therewith.

2. Description of the Prior Art

A light guiding structure is usually utilized for guiding light transmitted from a light emitting component to a panel module of an electronic device, so that users can judge a current operational condition of the electronic device by observing a position and a color of the light displayed on the panel module. However, the light emitting component can be considered as a point light source due to an optical characteristic of the light emitting component. That is, the light transmitted from the light emitting component travels radially instead of unidirectional travel. Therefore, the light transmitted from the light emitting component passes through not only the corresponding light guiding structure but also other adjacent light guiding structures.

As a result, the light transmitted from the light emitting component may be guided by different light guiding structures to different positions on the panel module at the same time. At this moment, the positions on the panel module cannot display the correct light corresponding to the light emitting components, so that the users cannot judge the current operational condition of the electronic device according to the positions of the light displayed on the panel module correctly.

Furthermore, when the plurality of light emitting components emits light with different colors to the same light guiding structure at the same time, the color of the light displayed on the panel module is mixed, so that the users cannot judge the current operational condition of the electronic device according to the color of the light displayed on the panel module correctly.

In order to solve the aforementioned problems, the current solution is to extend a distance between two adjacent light emitting components or dispose a partition between two adjacent light emitting components. However, it not only requires a larger mechanical space and but also results in assembling difficulty. Therefore, there is a need to design a light guiding structure capable of guiding light transmitted from a light emitting component in a limited mechanical space for displaying the light at a correct position and with a correct color on the panel module.

SUMMARY OF THE INVENTION

It is an objective of the present disclosure to provide a light guiding structure for guiding light transmitted from a plurality of light emitting components, and a light emitting device therewith for solving the aforementioned problems.

In order to achieve the aforementioned objective, a light guiding structure for guiding light transmitted from a plurality of light emitting components is disclosed. The light guiding component includes a resilient base and a plurality of light guiding columns. A plurality of through holes is separately formed on the resilient base. The plurality of light guiding columns resiliently engages with the plurality of through holes respectively. Each of the plurality of light emitting components is disposed on an end of the corresponding light guiding column, and the plurality of light guiding columns is for guiding the light transmitted from the plurality of light emitting components.

In order to achieve the aforementioned object, a light emitting device is disclosed to include a circuit board, a plurality of light emitting components, and a light guiding structure. The plurality of light emitting components is separately disposed on the circuit board. The light guiding structure includes a resilient base and a plurality of light guiding columns. The plurality of through holes is formed on the resilient base. The plurality of light guiding columns resiliently engages with the plurality of through holes respectively. Each of the plurality of light emitting components is disposed on an end of the corresponding light guiding column, and the plurality of light guiding columns is for guiding light transmitted from the plurality of light emitting components.

In summary, the light guiding structure of the present disclosure utilizes the plurality of light guiding columns separately disposed on the resilient base for guiding the light transmitted from the plurality of light emitting components and further utilizes the resilient base for isolating the light transmitted from each of the plurality of light emitting components to pass through the corresponding light guiding column separately, so as to prevent the light transmitted from the plurality of light emitting components from interfering with each other. As a result, it can achieve the dense distribution of the plurality of light emitting components disposed on the circuit board, which saves mechanical space and brings convenience in assembly. Additionally, the light emitting device of the present disclosure can ensure the light transmitted from the plurality of light emitting components being displayed at a correct position with a correct color, so that users can correctly be aware of a current operational condition of the light emitting device accordingly. Besides, each of the plurality of light emitting components of the present disclosure is disposed in the accommodating space of the corresponding light guiding column, so that the light transmitted from each of the plurality of light emitting components can be concentrated by the protruding surface, which prevents unnecessary loss of the light as the light travels. Afterwards, the light transmitted from each of the plurality of light emitting components can be diverged by the concave surface of the corresponding light guiding column, which allows users to observe the light diverged by the concave surface at any angle easily.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 1:
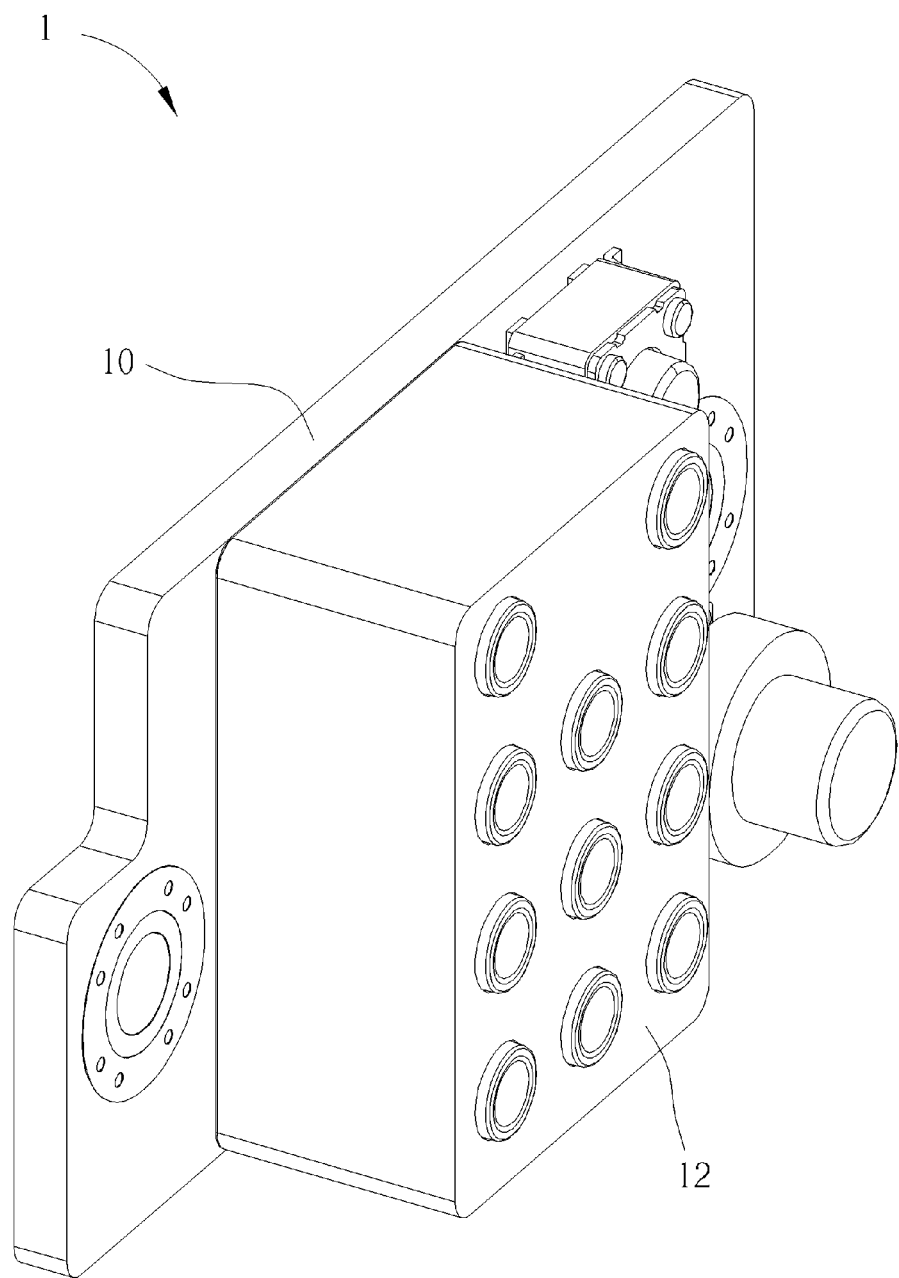
FIG. 1 is an internal structure diagram of a light emitting device according to an embodiment of the present disclosure.
Figure 2:
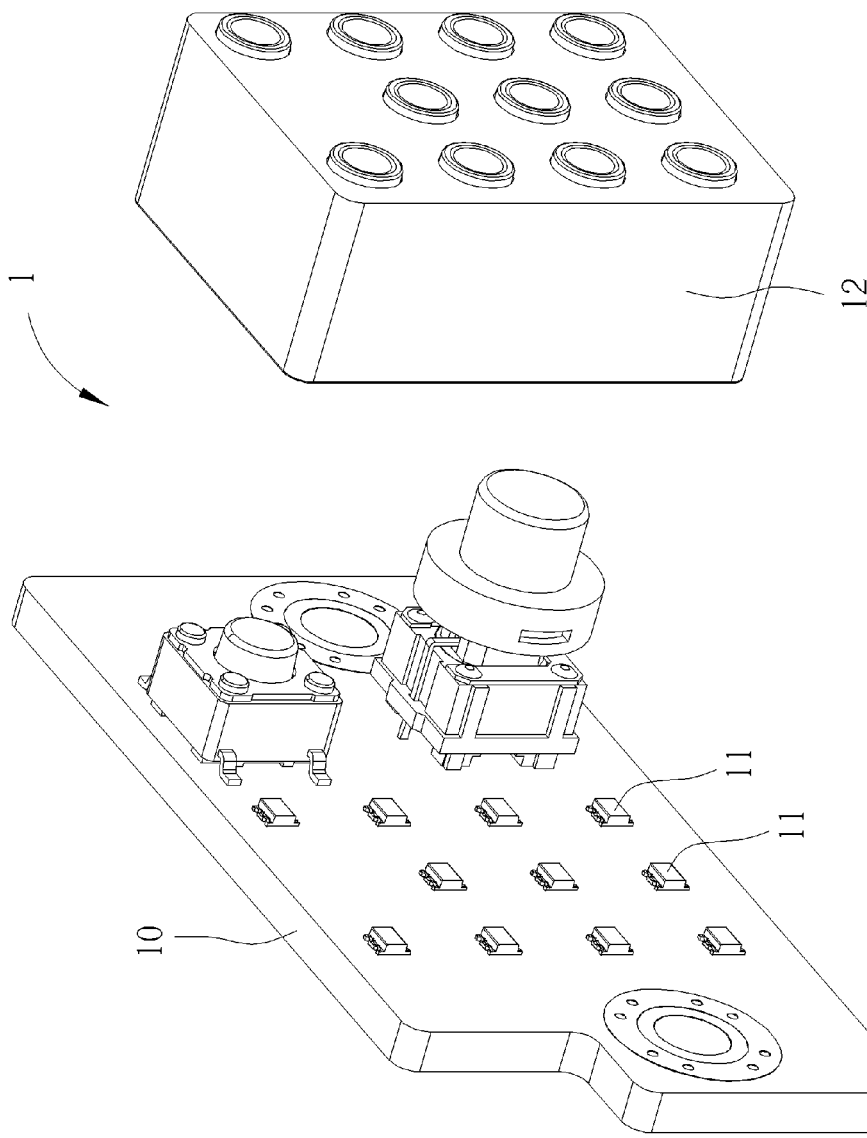
FIG. 2 is an exploded diagram of the light emitting device shown in FIG. 1 according to the embodiment of the present disclosure.

Please refer to FIG. 1 and FIG. 2. FIG. 1 is an internal structure diagram of a light emitting device 1 according to an embodiment of the present disclosure. FIG. 2 is an exploded diagram of the light emitting device 1 shown in FIG. 1 according to the embodiment of the present disclosure. As shown in FIG. 1 and FIG. 2, the light emitting device 1 includes a circuit board 10, a plurality of light emitting components 11, and a light guiding structure 12. The plurality of light emitting components 11 is separately disposed on the circuit board 10. In this embodiment, each of the plurality of light emitting components 11 can be a light emitting diode. The light guiding structure 12 is detachably combined with the circuit board 10. The light guiding structure 12 can guide light transmitted from the plurality of light emitting components 11 to a panel module, which is not shown in figures, of the light emitting device 1 for facilitating users to judge a current operational condition of the light emitting device 1 according to a position and a color of the light displayed on the panel module. In this embodiment, as shown in FIG. 2, the light emitting device 1 includes eleven light emitting components 11. However, the number and configuration of the light emitting component 11 are not limited to the figures of this embodiment.

Figure 3:
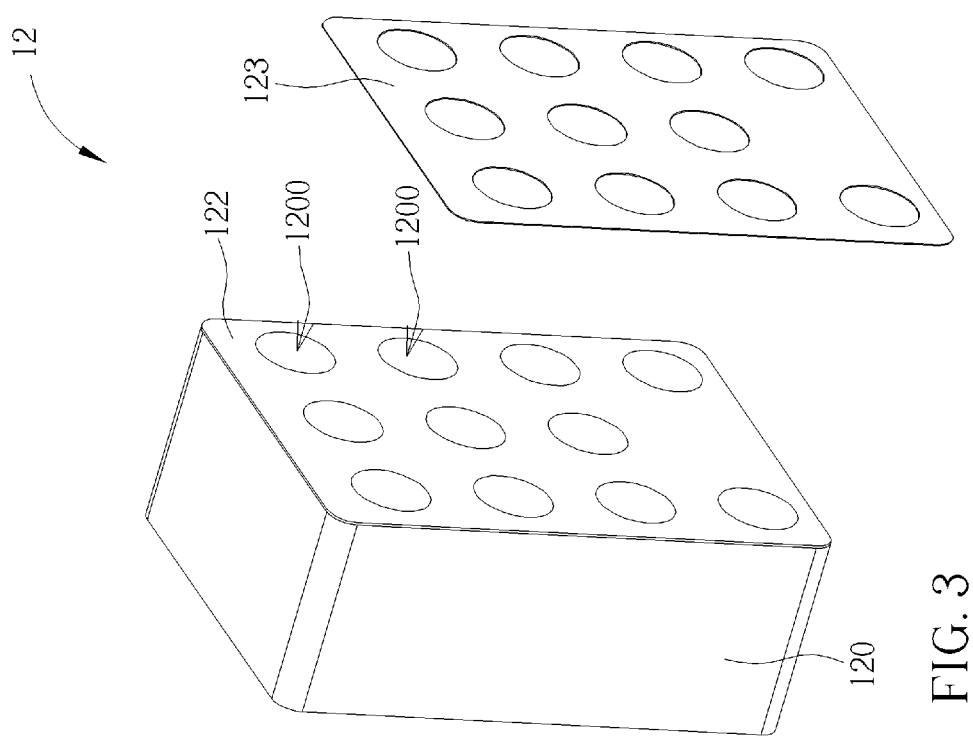
FIG. 3 is an exploded diagram of a light guiding structure according to the embodiment of the present disclosure.
Figure 3:
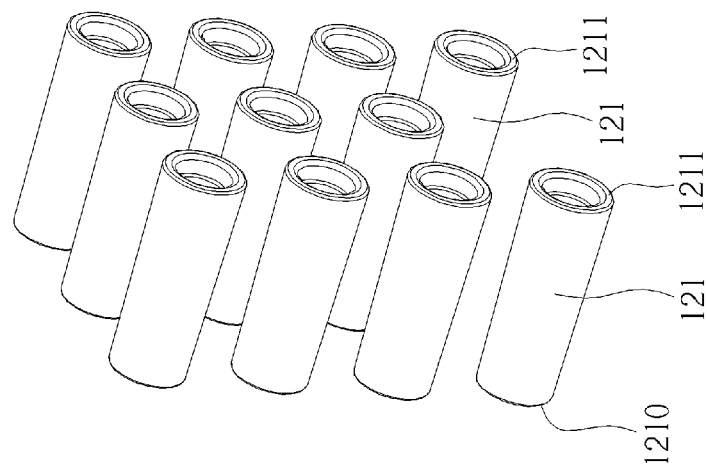

Please refer to FIG. 3. FIG. 3 is an exploded diagram of the light guiding structure 12 according to the embodiment of the present disclosure. As shown in FIG. 3, the light guiding structure 12 includes a resilient base 120 and a plurality of light guiding columns 121. The resilient base 120 is detachably combined with the circuit board 10. The plurality of light guiding columns 121 is separately disposed on the resilient base 120 and corresponding to the plurality of the light emitting components 11. In other words, as shown in FIG. 2 and FIG. 3, the number and positions of the light guiding columns 121 are corresponding to the ones of the light emitting components 11 respectively, so that each of the plurality of light emitting components 11 is located at an end of the corresponding light guiding columns 121 when the resilient base 120 is combined with the circuit board 10.

Furthermore, the plurality of light guiding columns 121 is for guiding the light transmitted from the plurality of light emitting components 11, and the resilient base 120 is for preventing the light transmitted from one of the plurality of light emitting components 11 from passing through another light guiding column 121 which is corresponding to another adjacent light emitting component 11. Therefore, in this embodiment, each of the plurality of light guiding columns 121 can be preferably made of Polycarbonate (PC) material with high light transmittance, and a color of the resilient base 120 can be preferably black or dark with high light absorbing property. Furthermore, the resilient base 120 can be made of rubber material or foam material, so that the resilient base 120 can be deformed for compensating assembly tolerance between components of the light emitting device 1 as the resilient base 120 is forced, which brings convenience in assembly.

As shown in FIG. 3, in this embodiment, the light guiding structure 12 can further include a non-conductive adhesive layer 122 and a release paper 123. The non-conductive adhesive layer 122 is formed on a side of the resilient base 120. The release paper 123 is detachably attached on the non-conductive adhesive layer 122. When it is desired to combine the resilient base 120 with the circuit board 10, the release paper 123 is detached from the side of the resilient base 120 and then the side of the resilient base 120 is attached on the circuit board 10 via the non-conductive adhesive layer 122. It should be noticed that the non-conductive adhesive layer 122 not only allows the resilient base 120 to be combined with the circuit board 10 but also prevents a short circuit of the circuit board 10 due to combination of the circuit board 10 and the resilient base 120. However, structures of the resilient base 120 and the circuit board 10 are not limited to thereto. For example, the resilient base 120 also can be attached on the circuit board 10 by screw components or engaging hooks.

Figure 4:
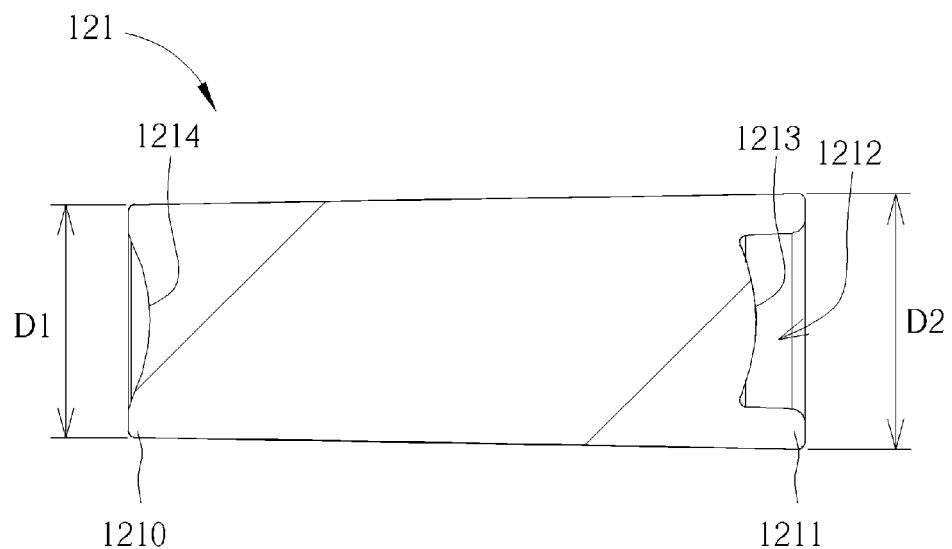
FIG. 4 is a sectional diagram of a light guiding column according to the embodiment of the present disclosure.

Please refer to FIG. 4. FIG. 4 is a sectional diagram of the light guiding column 121 according to the embodiment of the present disclosure. As shown in FIG. 4, each of plurality of the light guiding columns 121 includes a first end 1210 and a second end 1211. An accommodating space 1212 is formed on the second end 1211 of each of the plurality of the light guiding columns 121 for accommodating the corresponding light emitting component 11. A protruding surface 1213 is formed on the second end 1211 of each of the plurality of light guiding columns 121 and protrudes toward the accommodating space 1212. A concave surface 1214 is formed on the first end 1210 of each of the plurality of the light guiding columns 121. The plurality of protruding surfaces 1213 can concentrate the light transmitted from the plurality of light emitting components 11 respectively, and the plurality of concave surfaces 1214 can diverge the light transmitted from the plurality of light emitting components 11 respectively.

For example, in terms of optical structure, each of the plurality of protruding surfaces 1213 can be a convex lens structure, and each of the plurality of concave surfaces 1214 can be a concave lens structure. When the light guiding structure 12 is combined with the circuit board 10, each of the plurality of light emitting components 11 is accommodated in the corresponding accommodating space 1212 and located at a focus of the corresponding convex lens structure. In such a way, the light transmitted from each of the plurality of light emitting components 11, which is considered as a light point source, can be concentrated into parallel light by passing through the convex lens structure. Afterwards, the parallel light can be diverged after passing through the concave lens structure, so that users can observe the light transmitted out of the light guiding column 121 at any angle easily.

Figure 5:
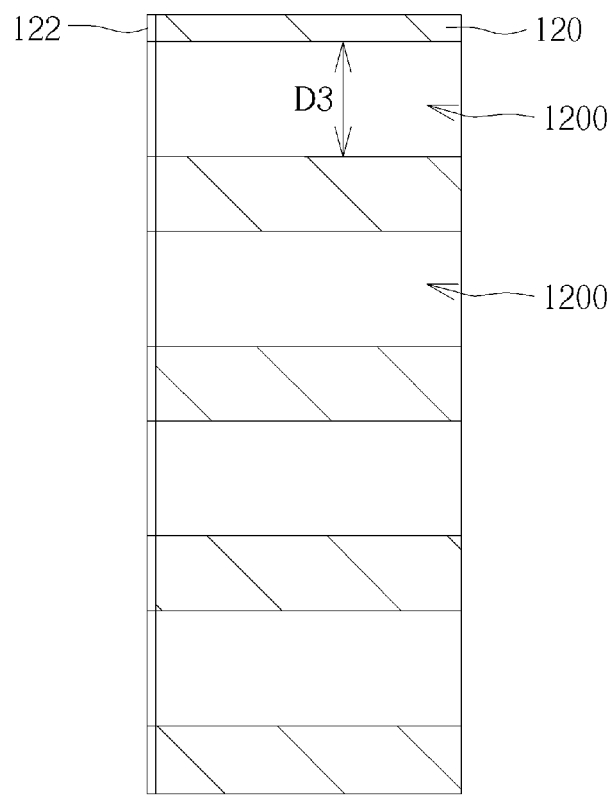
FIG. 5 is a sectional diagram of a resilient base according to the embodiment of the present disclosure.

Please refer to FIG. 5. FIG. 5 is a sectional diagram of the resilient base 120 according to the embodiment of the present disclosure. As shown in FIG. 3 to FIG. 5, a plurality of through holes 1200 is separately formed on the resilient base 120. The plurality of light guiding columns 121 resiliently engages with the plurality of through holes 1200 respectively. Specifically, the first end 1210 of each of the plurality of light guiding columns 121 has an outer diameter D1, the second end 1211 of each of the plurality of light guiding columns 121 has an outer diameter D2, and each of the plurality of through holes 1200 has an inner diameter D3. The outer diameter D1 of the first end 1210 of each of the plurality of light guiding columns 121 is less than the outer diameter D2 of the second end 1211 of each of the plurality of light guiding columns 121, and the inner diameter D3 of each of the plurality of through holes 1200 is greater than the outer diameter D1 of the first end 1210 of the corresponding light guiding column 121 and is less than the outer diameter D2 of the second end 1211 of the corresponding light guiding column 121. In other words, in this embodiment, the outer diameter of each of the plurality of light guiding columns 121 is gradually decreased from the second end 1211 to the first end 1210, and the inner diameter D3 of each of the plurality of through holes 1200 is uniform. However, the shapes of the light guiding column 121 and the through hole 1200 are not limited to this embodiment.

Figure 6:
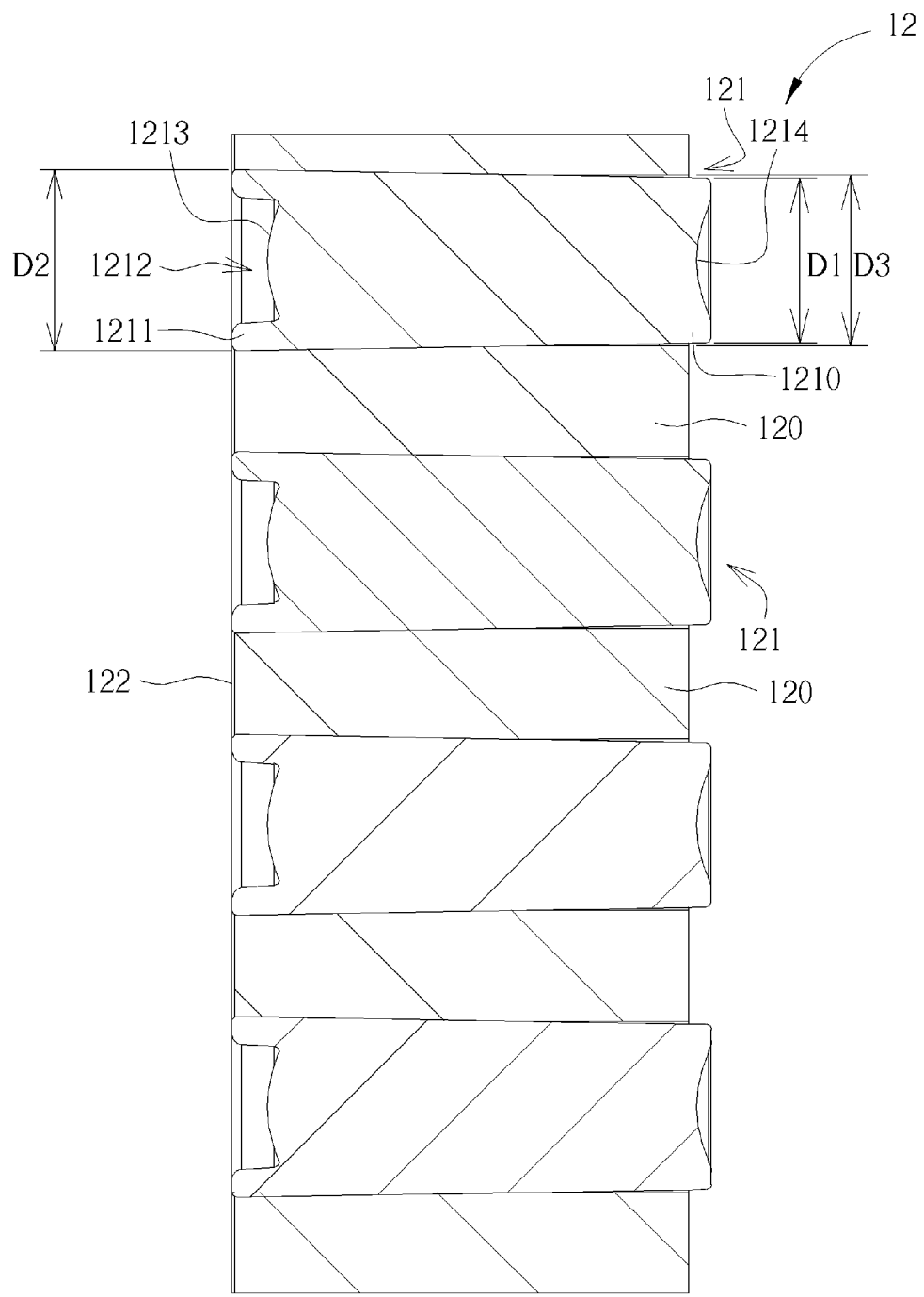
FIG. 6 is a sectional diagram illustrating that the light guiding column engages with the resilient base according to the embodiment of the present disclosure.

Please refer to FIG. 6. FIG. 6 is a sectional diagram illustrating that the light guiding column 121 engages with the resilient base 120 according to the embodiment of the present disclosure. As shown in FIG. 4 to FIG. 6, the inner diameter D3 of each of the plurality of through holes 1200 is greater than the outer diameter D1 of the first end 1210 of the corresponding light guiding column 121, so that an outer wall of the first end 1210 of each of the plurality of light guiding columns 121 does not contact with an inner wall of the corresponding through hole 1200 when the first end 1210 of each of the plurality of light guiding columns 121 passes through the corresponding through hole 1200. On the other hand, the inner diameter D3 of each of the plurality of through holes 1200 is less than the outer diameter D2 of the second end 1211 of the corresponding light guiding column 121, so that an outer wall of the second end 1211 of each of the plurality of light guiding columns 121 abuts against the inner wall of the corresponding through hole 1200 when the second end 1211 of each of the plurality of light guiding columns 121 passes through the corresponding through hole 1200. In such a way, the inner wall of each of the plurality of through holes 1200 is pressed by the second end 1211 of the corresponding light guiding column 121, so as to be deformed resiliently and to generate a resilient recovering force for firmly engaging each of the plurality of light guiding columns 121 with the corresponding through hole 1200.

It should be noticed that when the plurality of light guiding columns 121 resiliently engages with the plurality of through holes 1200 of the resilient base 120, the second end 1211 of each of the plurality of light guiding column 121 is located near the side of the resilient base 120 where the non-conductive adhesive layer 122 is formed, so that each of the plurality of light emitting components disposed on the circuit board 10 is accommodated in the accommodating space 1212 of the second end 1211 of the corresponding light guiding column 121 when the resilient base 120 is combined with the circuit board 10. Since the second end 1211 of each of the plurality of the light guiding columns 121 tightly fits with the inner wall of the corresponding through hole 1200, each of the plurality of light guiding columns 121 is prevented from disengaging from the corresponding through hole 1200 via the first end 1210. Furthermore, there is no gap between the second end 1211 of each of the plurality of the light guiding columns 121 and the corresponding through hole 1200, and therefore, it effectively prevents the light transmitted from the corresponding light emitting component 11 from leaking.

Figure 7:
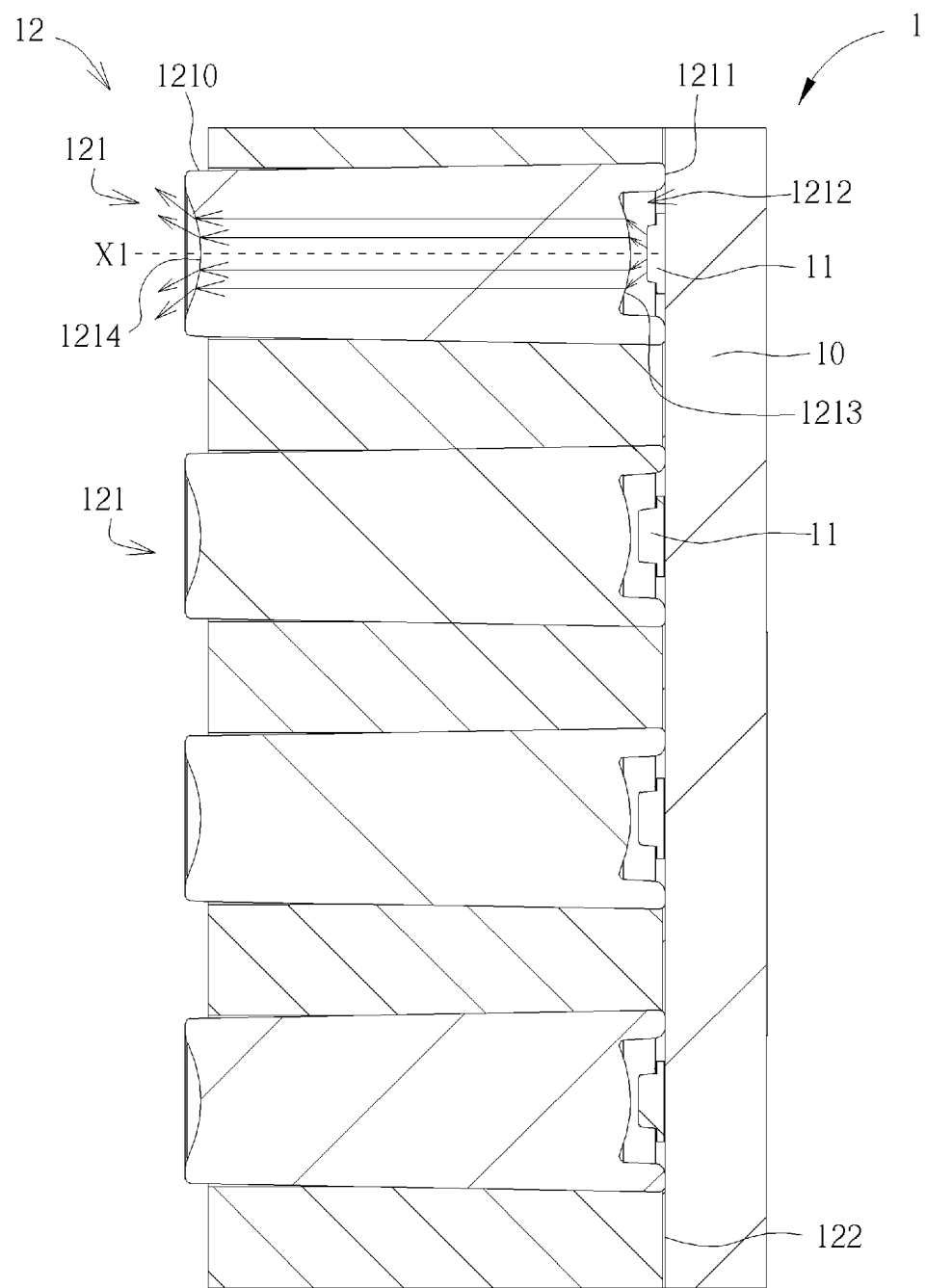
FIG. 7 is a sectional diagram of the light emitting device according to the embodiment of the present disclosure.

Please refer to FIG. 7. FIG. 7 is a sectional diagram of the light emitting device 1 according to the embodiment of the present disclosure. As shown in FIG. 1, FIG. 2, FIG. 3, and FIG. 7, when the resilient base 120 of the light guiding structure 12 is combined with the circuit board 10 by the non-conductive adhesive layer 122, the inner diameter D3 of each of the plurality of through holes 1200 is less than the outer diameter D2 of the second end 1211 of the corresponding light guiding column 121, and the circuit board 10 abuts against the second end 1211 of each of the plurality of light guiding columns 121 closely. Therefore, the plurality of light guiding columns 121 resiliently engages with the plurality of through holes 1200, and the plurality of light guiding columns 121 cannot slide relative to the resilient base 120, which prevents the plurality of light guiding columns 121 from disengaging from the side of the resilient base 120 where the non-conductive adhesive layer 122 is formed or the other opposite side of the resilient base 120.

Furthermore, since each of the plurality of light emitting components 11 is accommodated in the corresponding accommodating space 1212 and located at the focus of the corresponding protruding surface 1213, the light transmitted from each of the plurality of light emitting components 11 can be refracted by the protruding surface 1213 of the second end 1211 of the corresponding light guiding column 121 to concentrate along a direction parallel to a axial direction X1 of the corresponding light guiding column 121, which is illustrated by the arrow direction shown in FIG. 7. Therefore, the light transmitted from each of the plurality of light emitting components 11 travels from the second end 1211 to the first end 1210 of the light guiding column 121 in a straight line by the corresponding protruding surface 1213, which prevents unnecessary loss of the light as the light travels. And then, the light transmitted from each of the plurality of light emitting components 11 is refracted by the corresponding concave surface 1214 to diverge from the axial direction X1 of the corresponding light guiding column 121, which is illustrated by the arrow direction shown in FIG. 7. Therefore, it facilitates users to observe the light diverged by the concave surface 1214 of the first end 1210 of the corresponding light guiding column 121 at any angle easily.

In contrast to the prior art, the light guiding structure of the present disclosure utilizes the plurality of light guiding columns separately disposed on the resilient base for guiding the light transmitted from the plurality of light emitting components and further utilizes the resilient base for isolating the light transmitted from each of the plurality of light emitting components to pass through the corresponding light guiding column separately, so as to prevent the light transmitted from the plurality of light emitting components from interfering with each other. As a result, it can achieve the dense distribution of the plurality of light emitting components disposed on the circuit board, which saves mechanical space and brings convenience in assembly. Additionally, the light emitting device of the present disclosure can ensure the light transmitted from the plurality of light emitting components being displayed at a correct position with a correct color, so that users can correctly be aware of a current operational condition of the light emitting device accordingly. Besides, each of the plurality of light emitting components of the present disclosure is disposed in the accommodating space of the corresponding light guiding column, so that the light transmitted from each of the plurality of light emitting components can be concentrated by the protruding surface, which prevents unnecessary loss of the light as the light travels. Afterwards, the light transmitted from each of the plurality of light emitting components can be diverged by the concave surface of the corresponding light guiding column, which allows users to observe the light diverged by the concave surface at any angle easily.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A light guiding structure for guiding light transmitted from a plurality of light emitting components, the light guiding structure comprising:
    a resilient base whereon a plurality of through holes is separately formed; and
    a plurality of light guiding columns resiliently engaging with the plurality of through holes respectively, each of the plurality of light emitting components being disposed on an end of the corresponding light guiding column, and the plurality of light guiding columns being for guiding the light transmitted from the plurality of light emitting components, each of the plurality of the light guiding columns comprising a first end and a second end, an outer diameter of the first end of each of the plurality of light guiding columns being less than and gradually decreased from an outer diameter of the second end of each of the plurality of light guiding columns, when one of the plurality of light guiding columns passes through the corresponding through hole, an outer wall of the first end of the one of the plurality of light guiding columns not contacting with an inner wall of the corresponding through hole, and an outer wall of the second end of the one of the plurality of light guiding columns abutting against the inner wall of the corresponding through hole, so that the one of the plurality of light guiding columns resiliently engages with the corresponding through hole.

2. The light guiding structure of claim 1, wherein an inner diameter of one of the plurality of through holes is greater than the outer diameter of the first end of the corresponding light guiding column and is less than the outer diameter of the second end of the corresponding light guiding column.

3. The light guiding structure of claim 1, wherein an accommodating space is formed on the second end of each of the plurality of light guiding columns for accommodating the corresponding light emitting component.

4. The light guiding structure of claim 3, wherein a protruding surface is formed on the second end of each of the plurality of light guiding columns and protrudes toward the accommodating space for concentrating the light transmitted from the corresponding light emitting component, and a concave surface is formed on the first end of each of the plurality of light guiding columns for diverging the light transmitted from the corresponding light emitting component.

5. The light guiding structure of claim 1, further comprising a non-conductive adhesive layer formed on a side of the resilient base for attaching on a circuit board where the plurality of light emitting components is disposed, so as to combine the resilient base with the circuit board.

6. The light guiding structure of claim 5, further comprising a release paper detachably attached on the non-conductive adhesive layer.

7. The light guiding structure of claim 1, wherein the resilient base is made of rubber material or foam material.

8. The light guiding structure of claim 1, wherein a color of the resilient base is black or dark.

9. The light guiding structure of claim 1, wherein each of the plurality of light guiding columns is made of Polycarbonate material.

10. A light emitting device comprising:
    a circuit board;
    a plurality of light emitting components separately disposed on the circuit board; and
    a light guiding structure comprising:
        a resilient base whereon a plurality of through holes is formed; and
        a plurality of light guiding columns resiliently engaging with the plurality of through holes respectively, each of the plurality of light emitting components being disposed on an end of the corresponding light guiding column, and the plurality of light guiding columns being for guiding light transmitted from the plurality of light emitting components, each of the plurality of the light guiding columns comprising a first end and a second end, an outer diameter of the first end of each of the plurality of light guiding columns being less than and gradually decreased from an outer diameter of the second end of each of the plurality of light guiding columns, when one of the plurality of light guiding columns passes through the corresponding through hole, an outer wall of the first end of the one of the plurality of light guiding columns not contacting with an inner wall of the corresponding through hole, and an outer wall of the second end of the one of the plurality of light guiding columns abutting against the inner wall of the corresponding through hole, so that the one of the plurality of light guiding columns resiliently engages with the corresponding through hole.

11. The light emitting device of claim 10, wherein an inner diameter of one of the plurality of through holes is greater than the outer diameter of the first end of the corresponding light guiding column and is less than the outer diameter of the second end of the corresponding light guiding column.

12. The light emitting device of claim 10, wherein an accommodating space is formed on the second end of each of the plurality of light guiding columns for accommodating the corresponding light emitting component.

13. The light emitting device of claim 12, wherein a protruding surface is formed on the second end of each of the plurality of light guiding columns and protrudes toward the accommodating space for concentrating the light transmitted from the corresponding light emitting component, and a concave surface is formed on the first end of each of the plurality of light guiding columns for diverging the light transmitted from the corresponding light emitting component.

14. The light emitting device of claim 10, wherein the light guiding structure further comprises a non-conductive adhesive layer formed on a side of the resilient base for attaching on the circuit board, so as to combine the resilient base with the circuit board.

15. The light emitting device of claim 14, wherein the light guiding structure further comprises a release paper detachably attached on the non-conductive layer.

16. The light emitting device of claim 10, wherein the resilient base is made of rubber material or foam material, and a color of the resilient base is black or dark.

\* \* \* \* \*